United States Patent
Baek et al.

(10) Patent No.: US 12,225,626 B2
(45) Date of Patent: Feb. 11, 2025

(54) APPARATUS AND METHOD FOR PROVIDING SUBSCRIPTION DATA TO NON-SUBSCRIBER REGISTERED TERMINAL IN WIRELESS COMMUNICATION SYSTEM

(71) Applicant: SAMSUNG ELECTRONICS CO., LTD., Suwon-si (KR)

(72) Inventors: Youngkyo Baek, Suwon-si (KR); Sunghoon Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 268 days.

(21) Appl. No.: 17/753,541

(22) PCT Filed: Sep. 4, 2020

(86) PCT No.: PCT/KR2020/011969
§ 371 (c)(1),
(2) Date: Mar. 7, 2022

(87) PCT Pub. No.: WO2021/045573
PCT Pub. Date: Mar. 11, 2021

(65) Prior Publication Data
US 2022/0337995 A1    Oct. 20, 2022

(30) Foreign Application Priority Data

Sep. 6, 2019 (KR) .................. 10-2019-0110900
Feb. 14, 2020 (KR) .................. 10-2020-0018531

(51) Int. Cl.
*H04W 8/20* (2009.01)
*H04W 8/02* (2009.01)
*H04W 12/06* (2021.01)
*H04W 60/00* (2009.01)

(52) U.S. Cl.
CPC ............... *H04W 8/20* (2013.01); *H04W 8/02* (2013.01); *H04W 12/06* (2013.01); *H04W 60/00* (2013.01)

(58) Field of Classification Search
CPC ..... H04W 12/06; H04W 12/08; H04W 60/04; H04W 12/0433; H04W 36/0038;
(Continued)

(56) References Cited

U.S. PATENT DOCUMENTS 10,009,753 B2 * 6/2018 Chang ............... H04M 15/8083
11,706,619 B2 * 7/2023 Gundavelli ....... H04W 12/0433
726/6
(Continued)

FOREIGN PATENT DOCUMENTS

EP   3817423 A1 * 5/2021 ......... H04L 63/0892
EP   3930360 A1   12/2021
(Continued)

OTHER PUBLICATIONS

International Search Report and Written Opinion of the International Searching Authority in connection with International Application No. PCT/KR2020/011969 issued Dec. 15, 2020, 9 pages.
(Continued)

*Primary Examiner* — Matthew C Sams

(57) ABSTRACT

The present disclosure relates to a 5th generation (5G) or pre-5G communication system for supporting a higher data transmission rate after a 4th generation (4G) communication system such as long-term evolution (LTE). According to various embodiments of the present disclosure, according to various embodiments of the present disclosure, an operating method of a network exposure function (NEF) in a wireless communication system is provided. The method includes receiving a Nnef_EventExposure_subscribe request message including a first non-subscription registration identifier
(Continued)

(ID) from an application function (AF), transmitting a Namf_EventExposure_subscribe request message including the first non-subscription registration ID to a default unified data management (UDM), receiving a Namf_EventExposure_subscribe response message including a subscription correlation ID from the default UDM, transmitting a Nnef_EventExposure_subscribe response message including the subscription correlation ID to the AF, receiving a Namf_EventExposure_Notify message including a second non-subscription registration ID from the default UDM, and transmitting a Nnef_EventExposure_Notify message including the second non-subscription registration ID to the AF.

6 Claims, 7 Drawing Sheets

(58) Field of Classification Search
CPC ..... H04W 36/14; H04W 8/186; H04W 84/04; H04W 92/02; H04W 12/009; H04W 12/041; H04W 12/0431; H04W 12/062; H04W 12/068; H04W 48/16; H04W 48/18; H04W 76/11; H04W 76/25; H04W 80/10; H04W 88/023; H04W 8/20; H04W 8/02; H04W 60/00; H04L 63/0892; H04L 2463/082; H04L 63/061; H04L 63/08; H04L 63/0884; H04L 63/10; H04L 63/16; H04L 63/164; H04L 9/0844
See application file for complete search history.

(56) References Cited

U.S. PATENT DOCUMENTS

| | | | |
|---|---|---|---|
| 2018/0014178 A1 | 1/2018 | Baek et al. | |
| 2018/0317086 A1* | 11/2018 | Ben Henda | H04W 12/062 |
| 2019/0313358 A1* | 10/2019 | Lee | H04W 8/205 |
| 2020/0337093 A1 | 10/2020 | Kim et al. | |
| 2021/0306853 A1* | 9/2021 | Gundavelli | H04W 12/06 |
| 2022/0007184 A1* | 1/2022 | Ferdi | H04L 63/10 |

FOREIGN PATENT DOCUMENTS

| | | |
|---|---|---|
| KR | 10-2020-0114814 A | 10/2020 |
| WO | 2019098623 A1 | 5/2019 |
| WO | 2019103462 A1 | 5/2019 |

OTHER PUBLICATIONS

3GPP TS 23.502 V16.1.1 (Jun. 2019) Technical Specification; 3rd Generation Partnership Project; Technical Specification Group Services and System Aspects; Procedures for the 5G System; Stage 2 (Release 16); 494 pages.
3GPP TS 23.501 V16.1.0 (Jun. 2019) Technical Specification; 3rd Generation Partnership Project; Technical Specification Group Services and System Aspects; System Architecture for the 5G System; Stage 2 (Release 16); 367 pages.
3GPP TS 23.503 V16.1.0 (Jun. 2019) Technical Specification; 3rd Generation Partnership Project; Technical Specification Group Services and System Aspects; Policy and Charging Control Framework for the 5G System; Stage 2; (Release 16); 98 pages.
Notice of Patent Grant issued Jul. 22, 2024, in connection with Korean Patent Application No. 10-2020-0018531, 4 pages.
3GPP TS 24.501 V16.1.0 (Jun. 2019); Technical Specification; 3rd Generation Partnership Project; Non-Access-Stratum (NAS) protocol for 5G System (5GS); Stage 3; Release 15, 541 pages.
Nokia et al., "VN-Group parameter provisioning," 3GPP TSG-CT Meeting #85, CP-192027 (revision of C4-193649), Newport Beach, USA; Sep. 2019, 16 pages.
Huawei, "Pseudo-CR on AMF non 3GPP access registration," 3GPP TSG CT4 Meeting #83 C4-182409, Montreal, Canada; Mar. 2018, 5 pages.

* cited by examiner

APPARATUS AND METHOD FOR PROVIDING SUBSCRIPTION DATA TO NON-SUBSCRIBER REGISTERED TERMINAL IN WIRELESS COMMUNICATION SYSTEM

CROSS-REFERENCE TO RELATED APPLICATIONS

This application is a 371 of International Application No. PCT/KR2020/011969, filed Sep. 4, 2020, which claims priority to Korean Patent Application No. 10-2019-0110900, filed Sep. 6, 2019, and Korean Patent Application No. 10-2020-0018531, filed Feb. 14, 2020, the disclosures of which are herein incorporated by reference in their entirety.

BACKGROUND

1. Field

The present disclosure generally relates to a wireless communication system, and more particularly, an apparatus and a method for providing subscription data to a non-subscription registered terminal in the wireless communication system.

2. Description of Related Art

To satisfy a wireless data traffic demand which is growing after a 4th generation (4G) communication system is commercialized, efforts are exerted to develop an advanced 5th generation (5G) communication system or a pre-5G communication system. For this reason, the 5G communication system or the pre-5G communication system is referred to as a beyond 4G network communication system or a post long term evolution (LTE) system.

To achieve a high data rate, the 5G communication system considers its realization in an extremely high frequency (mmWave) band (e.g., 60 GHz band). To mitigate a path loss of propagation and to extend a propagation distance in the extremely high frequency band, the 5G communication system is discussing beamforming, massive multiple input multiple output (MIMO), full dimensional (FD)-MIMO, array antenna, analog beam-forming, and large scale antenna techniques.

Also, for network enhancement of the system, the 5G communication system is developing techniques such as evolved small cell, advanced small cell, cloud radio access network (RAN), ultra-dense network, device to device (D2D) communication, wireless backhaul, moving network, cooperative communication, coordinated multi-points (CoMP), and receive interference cancellation.

Besides, the 5G system is developing hybrid frequency shift keying and quadrature amplitude modulation (FQAM) and sliding window superposition coding (SWSC) as advanced coding modulation (ACM) schemes, and filter bank multi carrier (FBMC), non orthogonal multiple access (NOMA), and sparse code multiple access (SCMA) as advanced access technologies.

SUMMARY

Based on the discussions described above, the present disclosure provides an apparatus and a method for providing subscription data to a non-subscription registered terminal in a wireless communication system.

According to various embodiments of the present disclosure, an operating method of a network exposure function (NEF) in a wireless communication system is provided. The method includes receiving a Nnef_EventExposure_subscribe request message including a first non-subscription registration identifier (ID) from an application function (AF), transmitting a Namf_EventExposure_subscribe request message including the first non-subscription registration ID to a default unified data management (UDM), receiving a Namf_EventExposure_subscribe response message including a subscription correlation ID from the default UDM, transmitting a Nnef_EventExposure_subscribe response message including the subscription correlation ID to the AF, receiving a Namf_EventExposure_Notify message including a second non-subscription registration ID from the default UDM, and transmitting a Nnef_EventExposure_Notify message including the second non-subscription registration ID to the AF.

According to various embodiments of the present disclosure, an operating method of a UDM in a wireless communication system is provided. The method includes receiving a Namf_EventExposure_subscribe request message including a first non-subscription registration ID from a NEF, transmitting a Namf_EventExposure_subscribe response message including a subscription correlation ID to the NEF, and transmitting a Namf_EventExposure_Notify message including a second non-subscription registration ID to the NEF.

According to various embodiments of the present disclosure, an apparatus of a NEF in a wireless communication system is provided. The apparatus includes a transceiver and at least one processor, and the at least one processor is configured to receive a Nnef_EventExposure_subscribe request message including a first non-subscription registration ID from an AF, transmit a Namf_EventExposure_subscribe request message including the first non-subscription registration ID to a default UDM, receive a Namf_EventExposure_subscribe response message including a subscription correlation ID from the default UDM, transmit a Nnef_EventExposure_subscribe response message including the subscription correlation ID to the AF, receive a Namf_EventExposure_Notify message including a second non-subscription registration ID from the default UDM, and transmit a Nnef_EventExposure_Notify message including the second non-subscription registration ID to the AF.

An apparatus and a method according to various embodiments of the present disclosure, may provide an apparatus and a method for providing subscription data to a non-subscription registered terminal in a wireless communication system.

Effects obtainable from the present disclosure are not limited to the above-mentioned effects, and other effects which are not mentioned may be clearly understood by those skilled in the art of the present disclosure through the following descriptions.

type in a wireless communication system according to various embodiments of the present disclosure.

Figure 4:
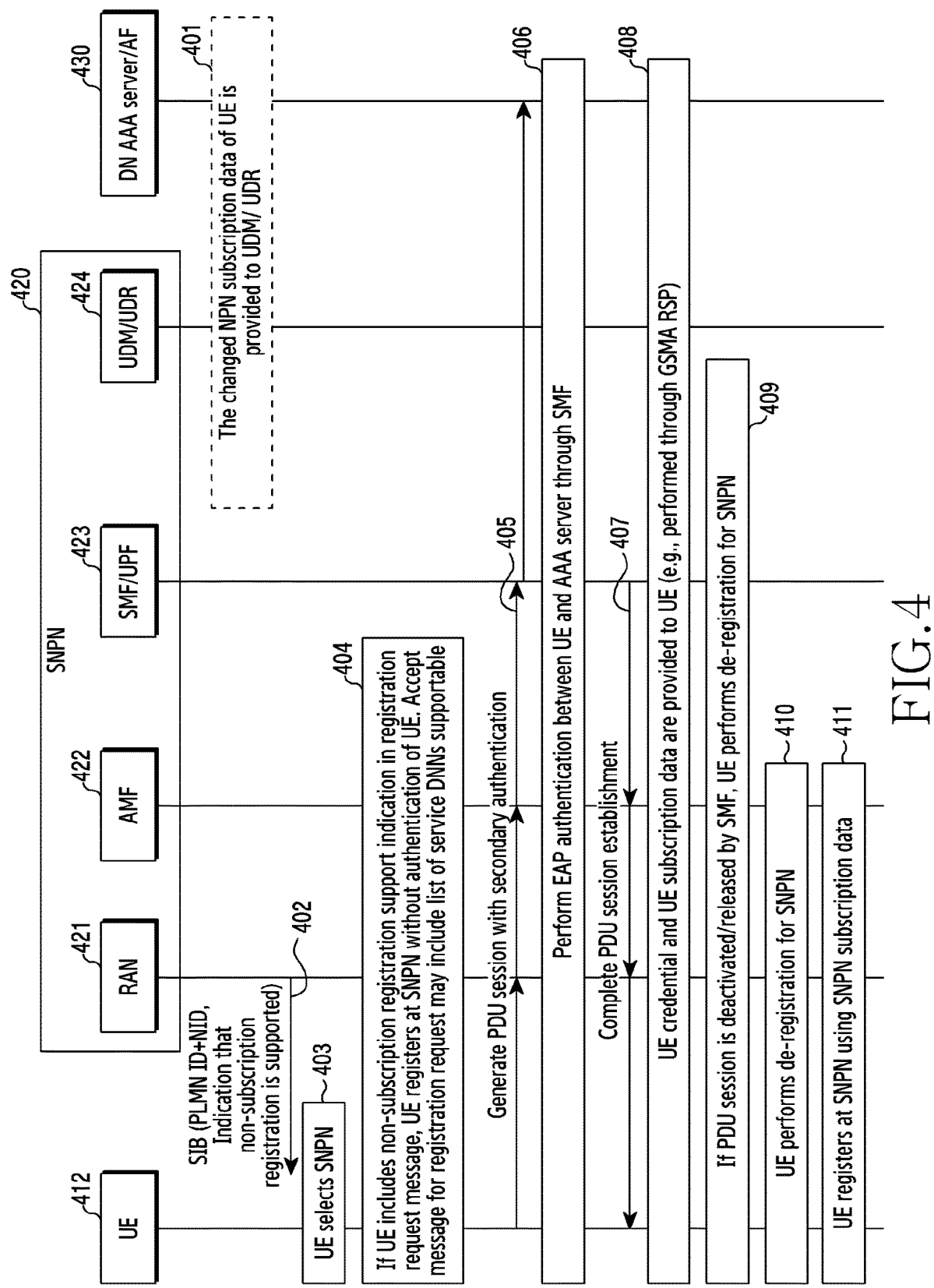

FIG. 4 illustrates a process of providing NPN subscription data to a non-subscription access terminal through a user plane in a wireless communication system according to various embodiments of the present disclosure.

Figure 5:
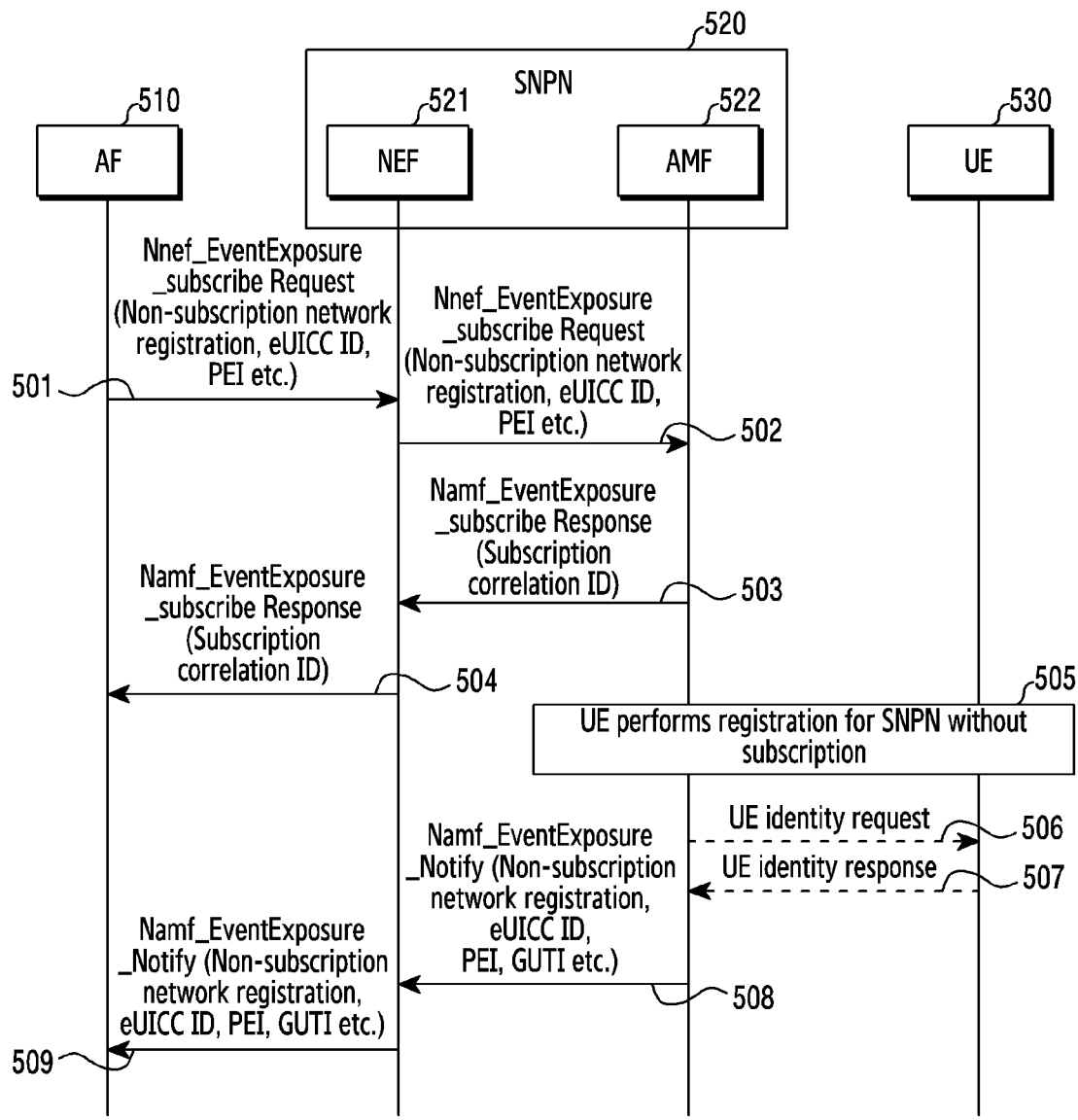

FIG. 5 illustrates a process of informing an application function (AF) of non-subscription network registration event occurrence through an access and mobility management function (AMF) if a terminal performs non-subscription network subscription in a wireless communication system according to various embodiments of the present disclosure.

Figure 6:
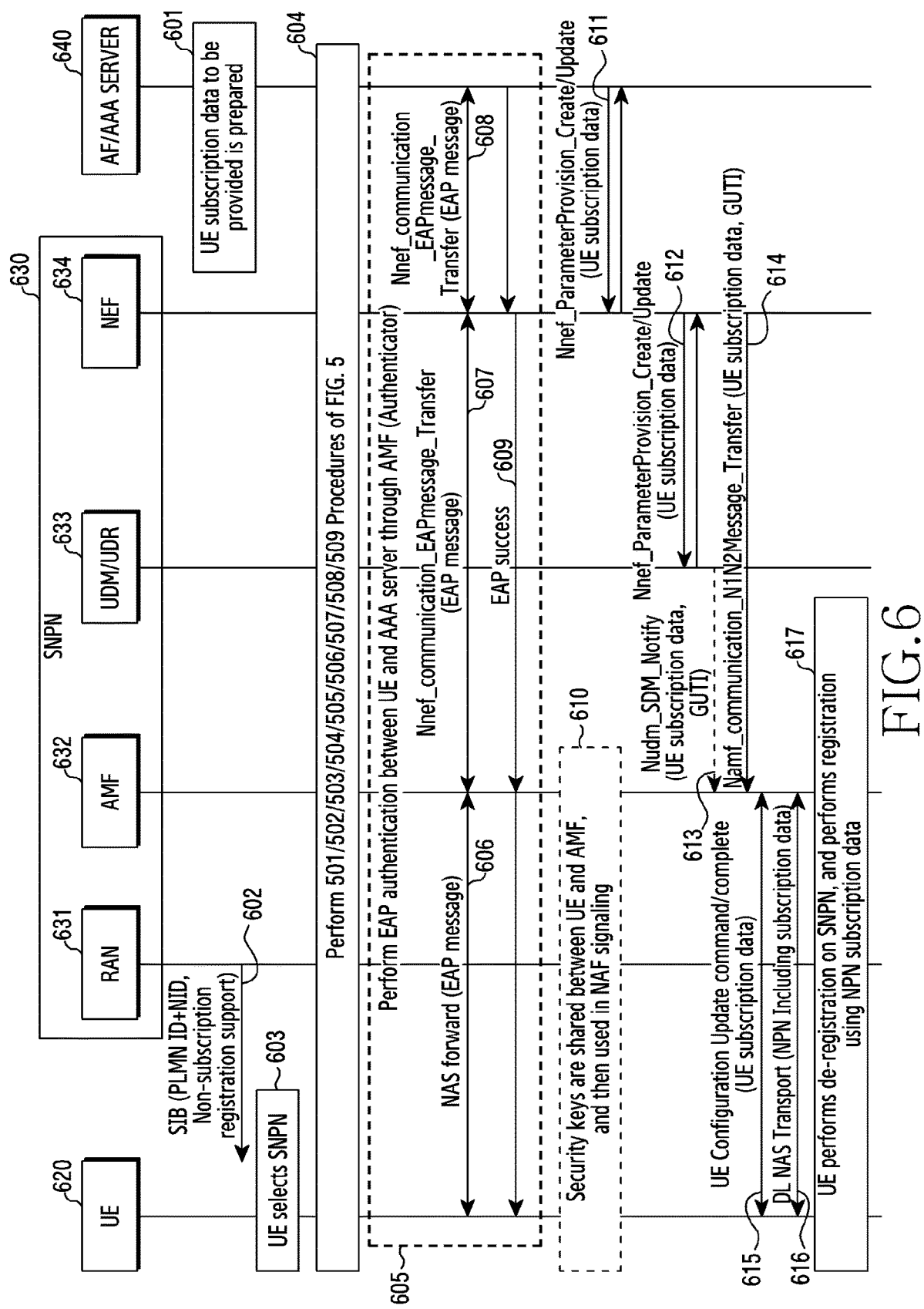

FIG. 6 illustrates a process of providing NPN subscription data to a terminal and a user data repository (UDR)/unified data management (UDM) through a control plane through a non-subscription access in a wireless communication system according to various embodiments of the present disclosure.

Figure 7:
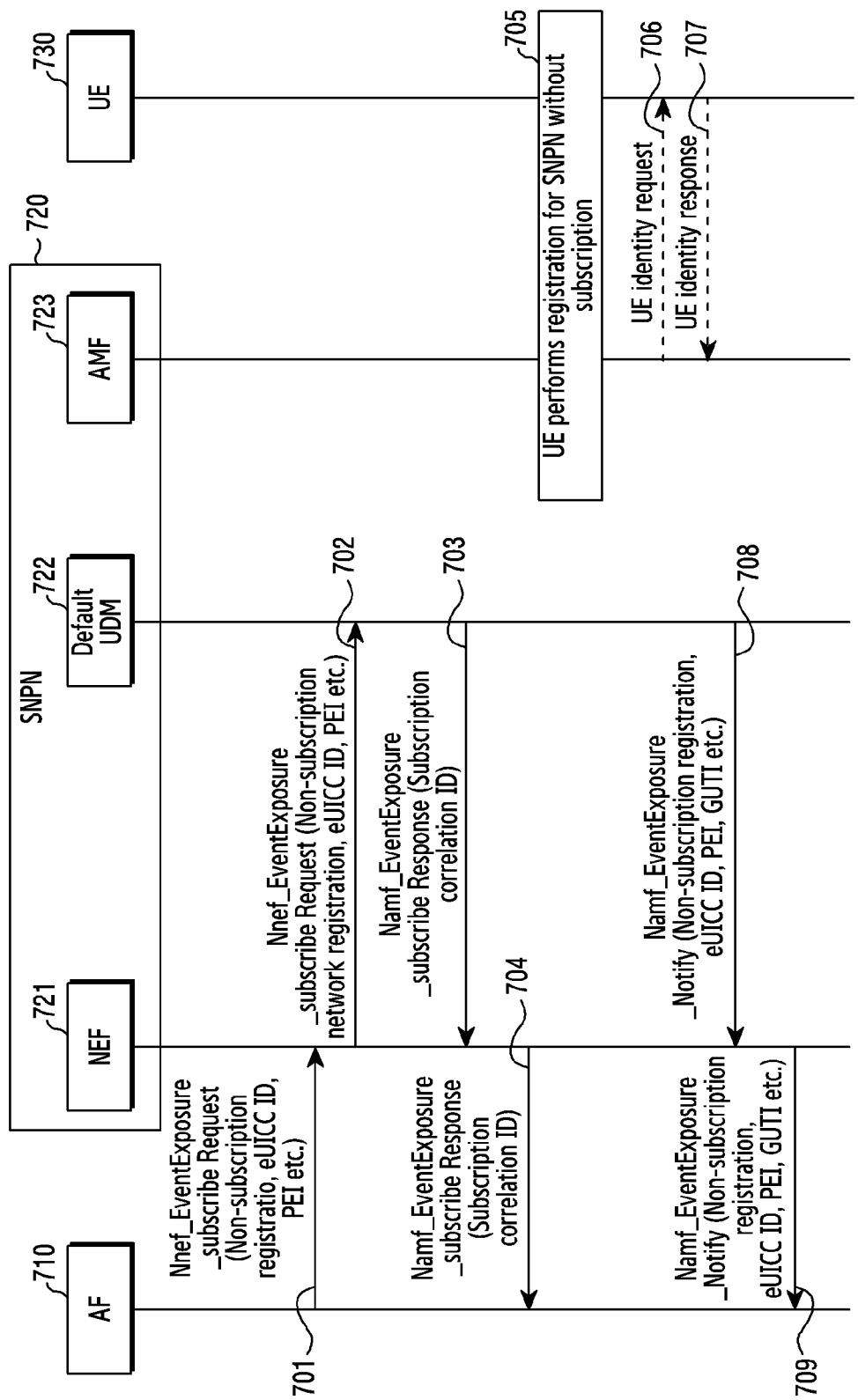

FIG. 7 illustrates a process of informing an AF of non-subscription network registration event occurrence through a UDM if a terminal performs non-subscription network registration in a wireless communication system according to various embodiments of the present disclosure.

DETAILED DESCRIPTION

Terms used in the present disclosure are used merely to describe specific embodiments, and may not intend to limit the scope of other embodiments. Singular expressions may include plural expressions unless the context clearly indicates otherwise. Terms used herein, including technical or scientific terms, may have the same meaning as those commonly understood by a person of ordinary skill in the technical field described in the present disclosure. Among the terms used in the present disclosure, terms defined in a general dictionary may be interpreted as having the same or similar meanings as those in the context of the related art, and unless explicitly defined in the present disclosure, may not be interpreted as ideal or excessively formal meanings. In some cases, even terms defined in the present disclosure may not be interpreted to exclude embodiments of the present disclosure.

A hardware-based approach will be described as an example in various embodiments of the present disclosure to be described hereafter. However, various embodiments of the present disclosure include technology which uses both hardware and software, and accordingly various embodiments of the present disclosure do not exclude a software-based approach.

Hereinafter, the present disclosure relates to an apparatus and a method for providing subscription data to a non-subscription registered terminal in a wireless communication system.

Terms for signals, terms indicating channels, terms indicating control information, terms indicating network entities, and terms indicating components of a device used in the following explanation are illustrated for convenience of description. Accordingly, the present disclosure is not limited to the terms to be described, and other terms having the same technical meaning may be used.

In addition, the present disclosure explains various embodiments using terms used in some communication standard (e.g., 3rd generation partnership project (3GPP)), but this is only an example for description. Various embodiments of the present disclosure may be easily modified and applied in other communication systems.

Figure 1:
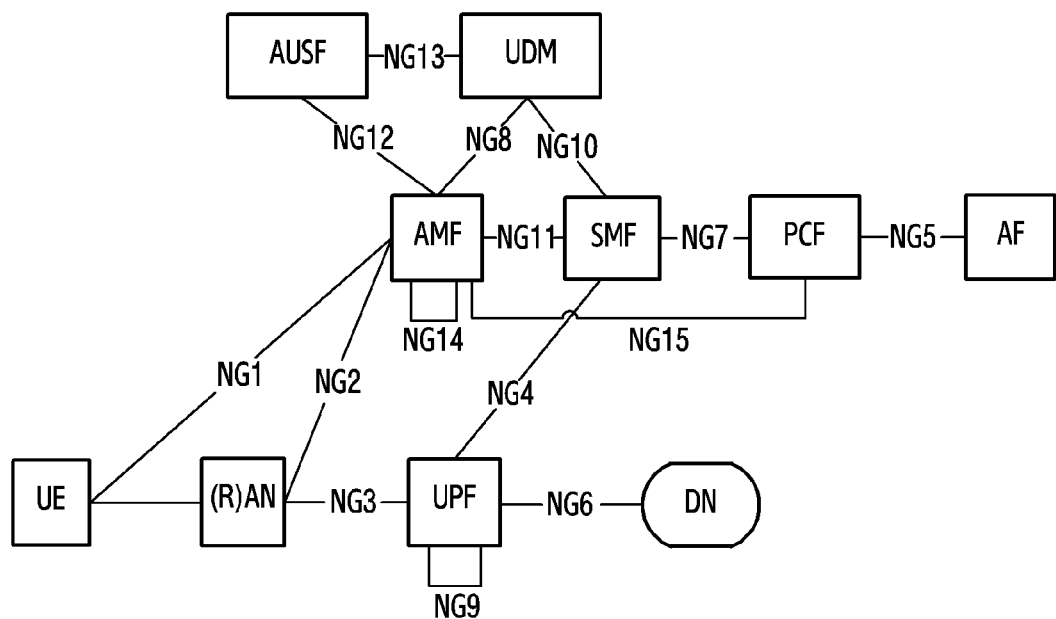
FIG. 1 illustrates an example of a 5th generation (5G) system architecture using reference point representation in a wireless communication system.

FIG. 1 illustrates an example of a 5th generation (5G) system architecture using reference point representation in a wireless communication system.

Referring to FIG. 1, the 5G system architecture may include various components (i.e., network functions (NFs)), and FIG. 1 illustrates an authentication server function (AUSF), a (core) access and mobility management function (AMF), a session management function (SMF), a policy control function (PCF), an application function (AF), a unified data management (UDM), a data network (DN), a user plane function (UPF), a (radio) access network, ((R)AN), and a terminal, that is, a user equipment (UE), corresponding to some of them.

The NFs each support the following functions.

The AUSF stores data for authentication of the UE.

The AMF provides a function for UE-based access and mobility management, and may be connected to one AMF per UE by default.

Specifically, the AMF supports functions such as signaling between code network (CN) nodes for mobility between 3GPP access networks, termination of a RAN communication processor (CP) interface (i.e., an NG2 interface), termination (NG1) of non-access stratum (NAS) signaling, NAS signaling security (NAS ciphering and integrity protection), AS security control, registration management (registration area management), connection management, idle mode UE reachability (including controlling and performing paging retransmission), mobility management control (subscription and policy), intra-system mobility and inter-system mobility support, support of network slicing, SMF selection, lawful intercept (for an AMF event and an interface to an LI system), provision of session management (SM) message delivery between the UE and the SMF, transparent proxy for SM message routing, access authentication, access authorization including roaming authorization check, delivery provision of SMS messages between the UE and an SMS function (SMSF), security anchor function (SAF) and/or security context management (SCM).

Some or all functions of the AMF may be supported within a single instance of one AMF.

The DN indicates, for example, an operator service, an internet access, or a 3rd party service. The DN transmits a downlink protocol data unit (PDU) to the UPF, or receives a PDU transmitted from the UE from the UPF.

The PCF receives packet flow information from an application server, and provides a function of determining policies such as mobility management and session management. Specifically, the PCF supports functions such as supporting a unified policy framework for controlling a network operation, providing a policy rule to allow CP function(s) (e.g., the AMF, the SMF, etc.) to enforce the policy rule, and implementing a front end for accessing relevant subscription information to determine a policy within a UDR.

The SMF may provide a session management function, and respective sessions may be managed by different SMFs if the UE has a plurality of sessions.

Specifically, the SMF supports functions such as session management (e.g., session establishment, modification and release including tunnel maintenance between the UPF and the AN node), UE IP address allocation and management (selectively including authentication), selection and control of a user plane (UP) function, traffic steering configuration for routing traffic from the UPF to a proper destination, termination of an interface for policy control functions, enforcement of a policy and a control part of quality of service (QoS), lawful intercept (for an SM event and an interface to an LI system), termination of an SM part of a NAS message, downlink data notification, an initiator of AN-specific SM information (deliver to the AN through the N2 via the AMF), service continuity (SSC) mode determination of a session, and roaming function.

Some or all functions of the SMF may be supported within a single instance of one SMF.

The UDM stores subscription data and policy data of the user. The UDM includes two parts, that is, an application front end (FE) and a UDR.

The FE includes a UDM FE which processes location management, subscription management, and credential and a PCF which controls a policy. The UDR stores data required for functions provided by the UDM-FE and a policy profile required by the PCF. The data stored in the UDR includes user subscription data and policy data including a subscription identifier, a security credential, access and mobility related subscription data and session related subscription data. The UDM-FE accesses the subscription information stored in the UDR, and supports functions such as authentication credential processing, user identification handling, access authentication, registration/mobility management, subscription management, and SMS managing.

The UPF forwards the downlink PDU received from the DN to the UE via the (R)AN, and forwards the uplink PDU received from the UE to the DN via the (R)AN.

Specifically, the UPF supports functions such as an anchor point for intra/inter radio access technology (RAT) mobility, an external PDU session point of interconnect to a data network, packet routing and forwarding, a user plane part of packet inspection and policy rule enforcement, lawful intercept, traffic usage amount report, an uplink classifier for supporting routing of a traffic flow to a data network, a branching point for supporting a multi-homed PDU session, QoS handling for the user plane (e.g., packet filtering, gating, uplink/downlink rating), uplink traffic verification (service data flow (SDF) mapping between an SDF and a QoS flow), transport level packet marking within uplink and downlink, downlink packet buffering and a downlink data notification triggering function. Some or all functions of the UPF may be supported within a single instance of one UPF.

The AF interoperates with a 3GPP core network to provide service (e.g., support functions such as influencing an application on traffic routing, accessing network capability exposure, interacting with a policy framework for policy control).

The (R)AN collectively refers to a new radio access network supporting all of evolved universal terrestrial radio access (UTRA) (E-UTRA) which is an evolved version of the 4G radio access technology and a new radio (NR) access technology (e.g., a next-generation node B (gNB)).

The gNB supports functions for radio resource management (i.e., radio bearer control, radio admission control, connection mobility control, dynamic allocation (i.e., scheduling) of resources to the UE in the uplink/downlink), internet protocol (IP) header compression, encryption and integrity protection of a user data stream, AMF selection in UE attachment if routing to the AMF is not determined from information provided to the UE, user plane data routing to UPF(s), control plane information routing to the AMF, connection setup and release, scheduling and transmission of a paging message (generated from the AMF), scheduling and transmission of system broadcast information (generated from the AMF or operation and maintenance (O&M)), measurement and measurement report configuration for mobility and scheduling, transport level packet marking in the uplink, session management, support of network slicing, QoS flow management and mapping to a data radio bearer, supporting a UE in an inactive mode, a NAS message distribution function, a NAS node selection function, radio access network sharing, dual connectivity, and tight interworking between the NR and the E-UTRA.

The UE indicates a user device. The user device may be referred to as a terminal, a mobile equipment (ME), a mobile station (MS), and the like. In addition, the user device may be a portable device such as a notebook, a mobile phone, a personal digital assistant (PDA), a smartphone, or a multimedia device, or may be a device which is not portable such as a personal computer (PC) or a vehicle mounted device.

FIG. 1 does not illustrate an unstructured data storage network function (UD SF), a structured data storage network function (SDSF), a network exposure function (NEF) and an NF repository function (NRF) for the clarity of description, but all of the NFs shown in FIG. 5 may interoperate with the UDSF, NEF and NRF if necessary.

The NEF provides a 3rd party, internal exposure/re-exposure, an application function, and means for safely exposing services and capabilities for edge computing, for example, provided by 3GPP network functions. The NEF receives information from other network function(s) (based on the exposed capability(s) of other network function(s)). The NEF may store the received information as structured data using a standardized interface as a data storage network function. The stored information is re-exposed by the NEF to other network function(s) and application function(s), and may be used for other purposes such as analysis.

The NRF supports a service discovery function. It receives an NF discovery request from the NF instance, and provides information of the discovered NF instance to the NF instance. In addition, it maintains available NF instances and their supported services.

The SDSF is a selective function for supporting a function of storing and retrieving information as structured data by any NEF.

The UDSF is a selective function for supporting a function of storing and retrieving information as unstructured data by any NF.

Meanwhile, FIG. 1 illustrates a reference model if the UE accesses one DN using one PDU session for convenience of description, but the present disclosure is not limited thereto.

The UE may access two (i.e., local and central) data networks at the same time using multiple PDU sessions. In this case, two SMF s may be selected for different PDU sessions. Yet, each SMF may have capability of controlling both a local UPF and a central UPF within the PDU session.

In addition, the UE may access two (i.e., local and central) data networks provided within one PDU session at the same time.

The 3GPP system defines a conceptual link interconnecting NFs within the 5G system as a reference point. The following illustrates reference points included in the 5G system architecture represented in FIG. 1.

Figure 2:
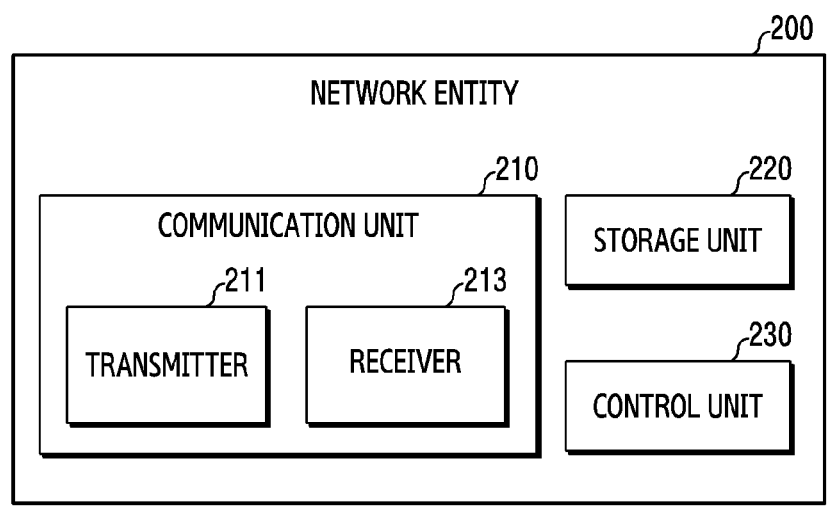
FIG. 2 illustrates a configuration of a network entity in a wireless communication system according to various embodiments of the present disclosure.

NG1: a reference point between the UE and the AMF
NG2: a reference point between the (R)AN and the AMF
NG3: a reference point between the (R)AN and the UPF
NG4: a reference point between the SMF and the UPF
NG5: a reference point between the PCF and the AF
NG6: a reference point between the UPF and the data network
NG7: a reference point between the SMF and the PCF NG8: a reference point between the UDM and the AMF NG9: a reference point between two core UPFs NG10: a reference point between the UDM and the SMF NG11: a reference point between the AMF and the SMF NG12: a reference point between the AMF and the AUSF NG13: a reference point between the UDM and the AUSF NG14: a reference point between two AMFs NG15: a reference point between the PCF and the AMF in a non-roaming scenario, a reference point between the PCF within a visited network and the AMF in a roaming scenario FIG. 2 illustrates a configuration of a network entity in a wireless communication system according to various embodiments of the present disclosure.

The network entity of the present disclosure is a concept including the network function according to the system implementation. A term such as '~ unit' or '~ er' used hereafter indicates a unit for processing at least one function or operation, and may be implemented using hardware, software, or a combination of hardware and software.

The network entity according to various embodiments of the present disclosure may include a communication unit 210, a storage unit 220, and a control unit 230 for controlling general operations of the network entity 200.

The communication unit 210 transmits and receives signals with other network entities. Hence, all or part of the communication unit 210 may be referred to as a 'transmitter 211', a 'receiver 213', or a 'transceiver/transceiver 210'.

The storage unit 220 stores data such as a basic program, an application program, and setting information for operations of the network entity 200. The storage unit 220 may include a volatile memory, a nonvolatile memory or a combination of a volatile memory and a nonvolatile memory. In addition, the storage unit 220 provides the stored data according to a request of the control unit 230.

The control unit 230 controls general operations of the network entity 200. For example, the control unit 230 transmits and receives signals through the communication unit 210. In addition, the control unit 230 records and reads data in and from the storage unit 220. In addition, the control unit 230 may perform functions of a protocol stack required by a communication standard. For doing so, the control unit 230 may include a circuit, an application-specific circuit, at least one processor or a micro processor, or may be a part of the processor. In addition, part of the communication unit 210 and the control unit 330 may be referred to as a CP. The control unit 230 may control the network entity 200 to perform any one operation of various embodiments of the present disclosure.

It is noted that the communication unit 210 and the control unit 230 are not implemented as separate modules necessarily, but may be implemented as a single component in the form of a single chip or a software block. The communication unit 210, the storage unit 220 and the control unit 230 may be electrically connected. In addition, operations of the network entity 200 may be realized by including the storage unit 220 which stores corresponding program code in the network entity 200.

The network entity 200 includes a network node, and may be any one of a base station (RAN), an AMF, an SMF, a UPF, an NF, a NEF, an NRF, a CF, an NSSF, a UDM, an AF, an AUSF, an SCP, a UDSF, a context storage, an operations, administration, and maintenance (OAM), an equipment management system (EMS), a configuration server, and an identifier (ID) management server.

For a private communication network locally operated for communication service provision in a smart factory, operating a private cellular network or a non-public network, or an NPN locally configured separately from a general public cellular network is being considered. It is general that each private cellular network uses separate subscriber information from the public cellular network. If the terminal moves between several private cellular networks, the terminal requires subscriber information to use in the private cellular network. For doing so, a method for providing the subscriber information to the terminal is required.

The private cellular network may include a private cellular network using a public cellular network of a public network integrated NPN (or a non-standalone NPN) type which includes a data network name (DNN) or network slice instance(s) of the public cellular network, and a cellular network of a standalone NPN type which is autonomously operated by the private cellular network without association with the public cellular network, depending on its operating scheme. Alternatively, there may be a cellular network of a standalone NPN (SNPN) type which is operated by a public cellular network operator.

In describing various embodiments of the present disclosure, terms such as the private cellular network, the NPN, the standalone NPN, the SNPN may be used interchangeably except where they are specifically distinguished and described.

If the terminal accesses the private cellular network of the SNPN type, the terminal needs subscriber information of the private cellular network for its access, but a method for providing the subscriber information of the private cellular network to the terminal is required if the terminal has not yet received the subscriber information of the private cellular network.

Various embodiments of the present disclosure introduce, if the SNPN supports a non-subscription access, a method for the terminal to perform the non-subscription access to the SNPN, and then receive subscriber information of the SNPN from the AF operated by an NPN service provider or a smart factory operator. The non-subscription access indicates a function which skips a subscriber authentication procedure according to an operator's selection even if the terminal has no subscriber information, or allows the terminal's access and allows (registration or register) the terminal's network access to enable only some service restricted by the operator even if the terminal's subscription authentication fails. In various embodiments of the present disclosure, terms such as un-authenticated access, or non-subscription registration, or un-authenticated network registration, or non-subscription network registration, or un-authenticated network access are used interchangeably instead of the non-subscription access but the terms have the same meaning.

Various embodiments of the present disclosure are not limited to the private communication network, and may be applied if the terminal receives the subscriber information over the public cellular network if the general public cellular network supports the non-subscription access.

If a private cellular network to be accessed by the UE is fixed, subscriber information of the private cellular network may be prestored in the UE and the UDR or the UDM of the private cellular network. However, if the private cellular network to be accessed by the UE is variously changed in response to the movement of the UE, it is necessary to provide and store subscriber data of the corresponding private cellular network to and in the UE and the UDR or the UDM of the corresponding private cellular network according to circumstances. In addition, the subscriber data stored in the UDR or the UDM of the corresponding private cellular network may be deleted, if necessary. Storing/deleting the subscriber information in/from the UDR or the UDM of the cellular network may be carried out through the AF which manages the subscriber information, but the corresponding private cellular network may be not used if the terminal has no subscriber information for accessing the cellular network.

Various embodiments of the present disclosure introduce, if the private cellular network supports the non-subscription access, a method for the terminal to perform the non-subscription access to the private cellular network, and then receive subscriber information of the private cellular networks from the AF operated by a service provider of the private cellular network or a smart factory operator.

Various embodiments of the present disclosure have an effect of enabling continuous and smooth use of the private cellular network service, even if the private cellular network accessed by the terminal is changed.

Besides, various embodiments of the present disclosure reduce a procedure and a cost for generating a PDU session, because the terminal does not generate a separate PDU session after accessing the private cellular network through the non-subscription access, and subscriber information of the terminal is provided to the terminal only through control signaling.

Figure 3:
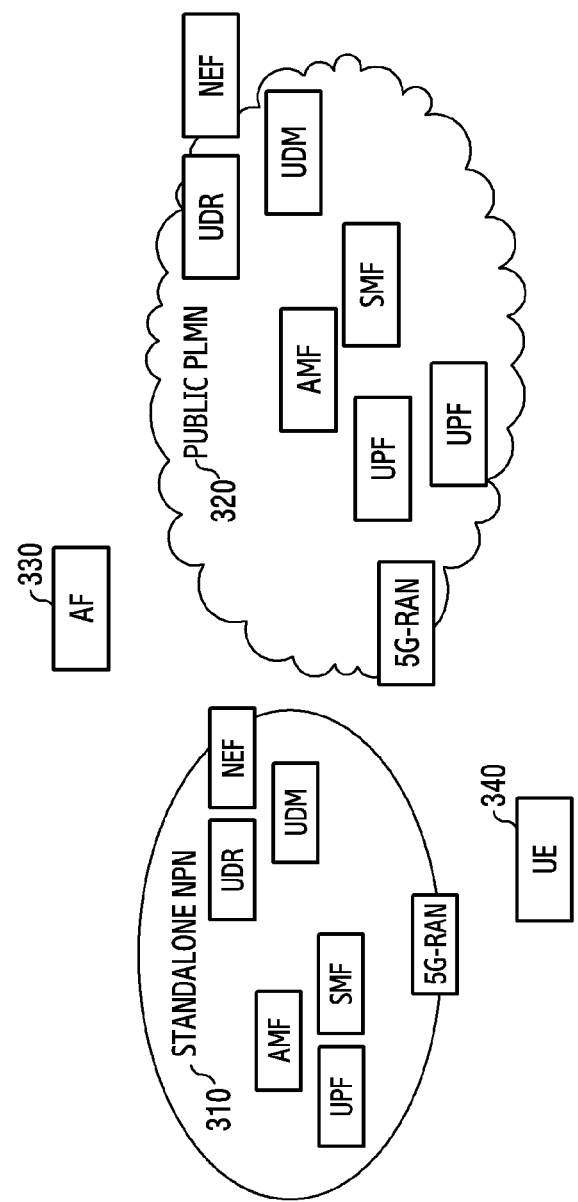
FIG. 3 is a diagram illustrates a private communication network structure of a standalone non-public network (NPN)

FIG. 3 illustrates a private communication network structure of a standalone NPN type in a wireless communication system according to various embodiments of the present disclosure.

Referring to FIG. 3, there is a cellular network 310 of the standalone NPN type which is autonomously operated by the private cellular network without association with the public cellular network (a public land mobile network (PLMN) 320).

The standalone NPN 310 which is the private cellular network is autonomously operated without association with the public cellular network 320, and has the same communication network structure as the public cellular network 320. The 5G-RAN may broadcast by setting mobile country code (MCC) information of a PLMN ID to a specific value together with a network ID (NID) of the standalone NPN 310. For example, the 5G RAN may use the value of MCC 999.

An AF 330 is an application server operated by a service provider to provide the NPN service outside the core network. The AF 330 provides subscriber information of UEs 340 to the NPN 310 through a network exposure function (NEF) 311. Alternatively, the AF 330 receives information inside the NPN 310, for example, a notification that a non-subscription access has occurred through the NEF 311, and thus provides authentication of an application level for the UE 340 or the user.

FIG. 4 illustrates a process of providing NPN subscription data to a non-subscription access terminal through a user plane in a wireless communication system according to various embodiments of the present disclosure.

If NPN subscription data of a UE 412 is changed in an UDM or UDR 424 of a standalone NPN 420 which is autonomously operated by the private cellular network without association with the public cellular network and if the UE 412 is subscribed to the standalone NPN 420, the UE 412 may obtain the changed NPN subscription data in a registration process or in a process after the registration.

However, if the UE 412 has no subscription data of the standalone NPN 420 but the standalone NPN 420 and the UE 412 support the non-subscription access, the NPN subscription data may be obtained through the user plane by accessing the standalone NPN 420 through an un-authenticated access according to an embodiment of FIG. 4.

In step 401, the changed NPN subscription data of the UE 412 is provided from the AF 430 to the UDM or UDR 424 of the standalone NPN 420 autonomously operated by the private cellular network without association with the public cellular network. (If the subscription of the UE 412 is determined in step 408, step 401 may be performed with step 408.)

Meanwhile, the standalone NPN 420 may support non-subscription registration, that is, the non-subscription access (or non-subscription network registration) to provide a method for the UE 412 not yet obtaining the NPN subscription data to access the standalone NPN 420 and obtain necessary NPN subscription data.

If the standalone NPN 420 supports the non-subscription access, a RAN 421 of an SNPN 420 may broadcast a PLMN ID (e.g., MCC=999) and an NID to notify network (NW) identification of the SNPN 420 to UEs in step 402. According to an embodiment, the RAN 421 of the SNPN 420 may include an indication that the SNPN 420 supports the un-authenticated network registration, or, a non-subscription registration support indication of the SNPN 420 together with the PLMN ID and the NID. That is, in step 402, the RAN 421 of the SNPN 420 transmits to the UE 412 a system information block (SIB) including the PLMN ID, the NID, and the indication that the SNPN 420 supports the non-subscription registration.

In step 403, if the UE 412 has no credential and subscription data for the SNPN 420, the UE 412, which wants to access the SNPN 420 and recognizes that the SNPN 420 supports the un-authenticated network registration, selects the NW. Whether the SNPN 420 supports the un-authenticated network registration may be obtained from the 'indication that the SNPN 420 supports the un-authenticated network registration' broadcasted by the RAN 421 of the SNPN 420, or determine that the SNPN 420 always supports the un-authenticated network registration if MCC=999.

The RAN 421 of the SNPN 420 may include and broadcast information indicating which limited services are available for the un-authenticated network registration, for example, a DNN list of supported services.

In step 403, the UE 412 selects the SNPN 420.

In step 404, the UE 412 transmits to the AMF 422 a registration request message for the un-authenticated network registration to the SNPN 420 including the non-subscription registration support indication, and the AMF 422 skips the authentication procedure for the UE 412 or treats as successful authentication even if the authentication of the UE 412 fails, thus proceeding and finishing the un-authenticated network registration. Alternatively, the authentication of the UE 412 may be performed based on non-subscription credentials stored in the UE 412. If the authentication of the UE 412 is completed, the un-authenticated network registration (or the non-subscription network registration) is proceeded and completed. In this case, an accept message for the registration request received by the UE 412 may include the DNN list of services limitedly supportable by the SNPN 420.

The AMF 422 may prestore information for servicing the UE 412 which is un-authenticated network registered (or, non-subscription network registered), for example, information such as the DNN list of the services limitedly supported by the SNPN 420. Alternatively, if recognizing that the UE 412 is a terminal which performs the non-subscription network registration, the AMF 422 may select the designated UDM 424 for the UE 412 which performs the non-subscription network registration, and receive from the UDM 424 the information for servicing the non-subscription network registration UE 412. For doing so, the UDM 424 used for the UE 412 which performs the non-subscription network registration may notify that the non-subscription network registration UE 412 is serviceable if registering the service providable by the UDM 424 at the NRF. In addition, the UDM 424 may access the AF 430 or the application server for downloading the SNPN subscription data and the credential of the non-subscription network registration UE 412, download the SNPN subscription data and the credential of the UE 412, and notify that the service delivered to the UE 412 may be provided.

Thus, in the un-authenticated network registration, the AMF 422 transmits a request for finding the adequate UDM 424 through the NRF including the indication indicative of the un-authenticated network registration together with the information of the accessing UE 412, for example, a permanent equipment ID (PEI), or eUICC ID information, or default credential information, in selecting the UDM 424, receives a response for the request and thus selects the UDM 424 used for the un-authenticated network registration UE 412.

In step 405, the UE 412 requests PDU session setup for the DNN of the service desired by the UE 412. The DNN of the service desired by the UE 412 is pre-configured in the UE 412, or included in a message broadcast by the RAN 421, or the UE 412 selects an appropriate DNN in the DNN list included in a registration accept message.

The PDU session setup request message may include a non-subscription registration support indication. Meanwhile, the AMF 422 receiving the PDU session setup request message selects the SMF 423 supporting secondary authentication, that is, extensible authentication protocol (EAP) authentication, and forwards the message to the selected SMF 423. The SMF 423 receiving the PDU session setup request message discovers a DN AAA server 430 if recognizing that the secondary authentication is required and starts a secondary authentication process with the DN AAA server 430.

The process that the SMF 423 recognizes that the secondary authentication is required may be carried out such that the SMF 432 refers to the non-subscription registration support indication included in the PDU session setup request message, or if forwarding a Nsmf_PDUSession_CreateSMContext request message including the PDU session setup request message received from the UE 412 which performs the un-authenticated network registration to the SMF 423, the AMF 422 includes the non-subscription registration support indication or the un-authenticated state to indicate that the secondary authentication is required for the PDU session. That is, in step 405, PDU session generation may be performed by the secondary authentication.

In step 406, the UE 412 performs the EAP authentication process with the DN AAA server 430 through the SMF 423. If the EAP authentication is successfully finished, in step 407, the UE 412 completes the PDU session establishment.

In the EAP authentication process of step 406, the UE 412 pre-shares a credential for mutual authentication between an operator of the SNPN 420 operating the DN AAA server 430, or a smart factory. For example, the UE 412 and the DN AAA server 430 may authenticate each other by using an ID/password or a certificate or the like.

In step 408, through the generated PDU session, the UE 412 accesses the AF 430 or the application server for downloading the SNPN subscription data and the credential of the UE 412, downloads the SNPN subscription data and the credential of the UE 412 and installs them on the UE 412. That is, in step 408, the credential of the UE 412 and the subscription data of the UE 412 are provided to the UE 412. According to an embodiment, step 408 may be performed through a global system for mobile communication (GSM) association remote subscriber identity module (SIM) provisioning (GSMA RSP).

In step 409, if the PDU session is deactivated or released, the SMF 423 informs the AMF 422, and the AMF 422 performs a procedure for releasing the network registration for the UE 412, if every PDU session generated for the un-authenticated UE is deactivated, every PDU session is released or every PDU session is deactivated or released.

In addition, the UE 412 installing new SNPN subscription data and credential in step 407 performs de-registration on the SNPN 420 currently accessed to access the SNPN 420 by use of the SNPN subscription data and the credential newly received in step 410.

In step 411, the UE 412 re-accesses the SNPN 420 using the newly allocated SNPN subscription data and credential. That is, the UE 412 registers at the SNPN 420 using the SNPN subscription data.

FIG. 5 illustrates a process of informing an AF of a non-subscription network registration event occurrence through an AMF if a terminal registers at a non-subscription network in a wireless communication system according to various embodiments of the present disclosure.

Referring to FIG. 5, if recognizing that a UE 530 has performed the non-subscription network registration at an NPN 520, or, an SNPN 520, an AF 510 may be used to provide NPN subscriber information for the UE 530 according to a service provided by the AF 510.

In step 501, to obtain whether the UE 530 has performed the non-subscription network registration, the AF 510 requests subscription for the non-subscription network registration through a Nnef_EventExposure_subscribe request message from an NEF 521 of the NPN 520. Hence, the Nnef_EventExposure_subscribe request message includes non-subscription registration, that is, "non-subscription network registration" as an event ID. If the AF 510 wants to obtain non-subscription network registration occurrence for the UE 530 under a specific condition, the Nnef_EventExposure_subscribe request message may include the specific condition for the UE 530. For example, an embedded universal mobile telecommunication system (UMTS) integrated circuit (IC) card (eUICC) ID of the accessed UE 530, or an eUICC ID list, or an eUICC ID range, or a PEI, or a PEI list or a PEI range or a user ID, or a generic public subscription identifier (GPSI), or a GPSI list, or GPSI range values may be included as the specific condition of the UE 530.

The NEF 521 receiving the Nnef_EventExposure_subscribe request message requests subscription for the non-subscription network registration occurrence through a Namf_EventExposure_subscribe request message to AMF(s) 522 of the NPN 520 to check a non-subscription network registration occurrence situation in step 502. At this time, the Namf_EventExposure_subscribe request message includes the non-subscription registration, that is, "non-subscription network registration" as an event ID. If the specific condition for the UE 530 is given in step 501, the subscription for the non-subscription network registration occurrence event is requested by including the same specific condition.

If the Namf_EventExposure_subscribe request of step 502 is accepted by the AMF 522, the AMF 522 forwards a Namf_EventExposure_subscribe response message including a subscription correlation ID to the NEF 521 to inform that the subscription has been performed, in step 503.

In step 504, the NEF 521 receiving the Namf_EventExposure_subscribe response message forwards to the AF 510 the Nnef_EventExposure_subscribe response message including the subscription correlation ID indicating that the Nnef_EventExposure_subscribe request has been accepted.

In step 505, the UE 530 registers for the SNPN 520 without subscription. If the UE 530 registers at the NPN 520 with the non-subscription network registration, the AMF 522 recognizes the non-subscription network registration occurrence in step 505, and notifies the AF 510 of the subscription event occurrence in step 508 and step 509 by considering the specific condition for the terminal 530 according to the subscription.

If the AMF 522 may not acquire the information of the accessed UE 530 during the network registration process or after the network registration for the NPN 520 of the UE 530 in step 505, necessary information may be requested and received from the UE 530 in step 506 and step 507. In this case, for example, a UE identity request/response message may be used. The information of the UE 530 which may be requested and received by the AMF 522 may be the user ID, or the GPSI, or the PEI, or the eUICC ID.

If recognizing that the non-subscription network registration of the UE 530 satisfying the specific condition occurs, the AMF 522 transmits a Namf_EventExposure_Notify message to the NEF 521 in step 508 and notifies that the event satisfying the specific condition has occurred. The Namf_EventExposure_Notify message includes non-subscription registration, that is, "non-subscription network registration" as the event ID, and may include whole or part of the information of the UE 530, for example, the user ID, or the GPSI, or the PEI, or the eUICC ID, or a globally unique temporary identifier (GUTI) value assigned by the AMF 522 to the UE 530. In addition, some or all of information of the AMF 522, for example, an AMF name, or globally unique AMF identifier (GUAMI) information may be included to inform of the information of the AMF 522 accessed by the UE 530.

In step 509, the NEF 521 receiving the Namf_EventExposure_Notify message sends a Nnef_EventExposure_Notify message to the AF 510 to notify the AF 510 that the event satisfying the specific condition has occurred. The Nnef_EventExposure_Notify message includes the non-subscription registration, that is, "non-subscription network registration" as the event ID, and includes the information of the UE 530 and the information of the AMF 522 received in step 508.

If Nnef_EventExposure_unsubscribe is used instead of Nnef_EventExposure_subscribe in step 501 and step 504 explained in the description of the embodiment, the event previously subscribed to the NEF 521 may be released. In this case, the Nnef_EventExposure_unsubscribe request message includes a previously allocated subscription correlation ID. Also, the NEF 521 forwards a processing result of the Nnef_EventExposure_unsubscribe request to the AF 510 through a Nnef_EventExposure_unsubscribe response message.

Likewise, if Namf_EventExposure_unsubscribe is used instead of Namf_EventExposure_subscribe in step 502 and step 503, the event previously subscribed to the AMF 522 may be released. In this case, the Namf_EventExposure_unsubscribe request message includes a previously allocated subscription correlation ID. Also, the AMF 522 forwards a processing result of the Namf_EventExposure_unsubscribe request to the NEF 521 through a Namf_EventExposure_ unsubscribe response message. Hence, steps 505, 506, 507, 508, and 509 no longer need to be executed.

Alternatively, if the above-described steps 501, 502, 503, and 504 are omitted, and the UE performs the non-subscription network registration in step 505, the AMF 522 notifies the AF 510 for servicing the non-subscription network registration UE 530 of the access of the non-subscription network registration UE 530 in steps 508 and 509. At this time, the AMF 522 or the NEF 521 may discover the AF 510 through the information forwarded in step 505 or step 507, for example, a fully qualified domain name (FQDN) configured through the eUICC ID, or PEI information, or default credential information of the UE 530, or an address value of a configured provisioning server.

According to yet another embodiment associated with FIG. 5 of the present disclosure, if the AF 510 belongs to a trusted domain of the SNPN 520, the AF 510 may directly exchange the Namf_EventExposure_subscribe request/response messages with the AMF 522 through the process of step 502 and step 503, instead of passing through the NEF 521, and thus subscribe the event for the non-subscription network registration occurrence at the AMF 522. In addition, if an event for the non-subscription network registration occurrence occurs, the AMF 522 sends a Namf_EventExposure_Notify message to the AF 510 and notifies that the event for the non-subscription network registration occurrence has occurred.

Alternatively, if the above-described steps 501, 502, 503, and 504 are omitted, and the UE 530 performs the non-subscription network registration in step 505, the AMF 522 may notify the access of the non-subscription network registration UE 530 by directly transmitting a Namf_EventExposure_Notify message to the AF 510 for providing the service for the non-subscription network registration UE 530 without passing through the NEF 521. At this time, the AMF 522 may discover the AF 510 through the information forwarded by the UE 530 in step 505 or step 507, for example, the FQDN configured through the eUICC ID, or the PEI information, or the default credential information of the UE 530, or the address value of the configured provisioning server.

FIG. 6 illustrates a process of providing NPN subscription data to a terminal and a UDR/UDM through a control plane through a non-subscription access in a wireless communication system according to various embodiments of the present disclosure.

If NPN subscription data of a specific UE 620 is newly generated or changed in a standalone NPN 630 autonomously operated by the private cellular network without association with the public cellular network and needs to be provided to a UE 620 and a UDM/UDR 633 of 630 of the NPN 630, if the UE 620 has no subscription data of the NPN 630 and the NPN 630 and the UE 620 support the non-subscription access, the NPN subscription data may be provided to the UE 620 and the UDM/UDR 633 of the NPN 630 through the control plane by accessing the NPN 630 through the un-authenticated access in the embodiment of FIG. 6.

In step 601, preparing the NPN subscription data is performed in an AP 640 which provides NPN subscription data for the UE 620 to the standalone NPN 630 autonomously operated by the private cellular network without association with the public cellular network. That is, in step 601, the UE subscription data to be provided is prepared. Step 601 may be delayed until NPN subscription of the UE 620 is determined and NPN subscription data is determined before step 611 and step 612 start. Alternatively, step 601 may be delayed until NPN subscription data to be used is determined while exchanging messages between the UE 620 and the AF 640 during an EAP authentication process of step 605.

The standalone NPN 630 may support the non-subscription registration, that is, a non-subscription access (or non-subscription network registration) to provide a method for the UE 620 not yet obtaining the NPN subscription data to access the standalone NPN 630 and acquire necessary NPN subscription data.

If the SNPN 630 supports the non-subscription access, the RAN 631 of the SNPN 630 may broadcast a PLMN ID (MCC=999) and n NID to inform the UEs 620 of NW identification of the SNPN 630 in step 602, and may include an indication (or, a non-subscription registration support indication) indicating that the SNPN 630 supports the un-authenticated network registration. That is, that is, in step 602, the RAN 631 of the SNPN 630 transmits to the UE 620 an SIB including the PLMN ID, the NID, and the indication that the SNPN 630 supports the non-subscription registration.

If the UE 620 has no credential and subscription data of the SNPN 630, if the UE 620 wants to access the SNPN 630 and recognizes that the SNPN 630 supports the un-authenticated network registration, it performs the NW selection for the SNPN 630. The UE 630 may obtain whether the SNPN 630 supports the un-authenticated network registration from the 'indication that the SNPN 630 supports the un-authenticated network registration' broadcasted by the RAN 631 of the SNPN 630, the terminal 630 may determine that the SNPN 630 always supports the un-authenticated network registration if MCC=999, or if the PLMN ID and the NID are broadcast together and the UE 620 recognizes the SNPN 630, the UE 620 may determine that the SNPN 630 always supports the un-authenticated network registration.

In step 603, the UE 620 selects the SNPN 630.

In step 604, the UE 620 performs the un-authenticated network registration at the SNPN 630, and the AF 640 conducting event registration for the un-authenticated network registration of the UE 620 recognizes which UE has performed the un-authenticated network registration at the SNPN 630 according to steps 501/502/503/504/505/506/507/508/509 steps of FIG. 5, or steps 701/702/703/704/705/706/707/708/709 of FIG. 7. Hence, a process of providing the NPN subscription data prepared in step 601 to the UE 620 is performed. That is, the AF 640 forwards the NPN subscription data to the UE 620. Before forwarding the NPN subscription data to the UE 620, the AF 640 may perform authentication of the application layer for the authentication of the UE 620 or the user of the UE 620 according to a policy of the SNPN 630 or the AF 640.

For example, the AMF 632 forwards a message notifying that the UE 620 has performed the un-authenticated network registration to the AF 640 together with information of the UE 620, for example, a PEI, or an eUICC ID, or a user ID, or a GPSI to the AF 640 through an NEF 634 in step 604.

In step 605, the AF 640, that is, the AAA server 640 performs the EAP authentication process with the UE 620. At this time, the AMF 632 or the NEF 634 serves as an authenticator.

Step 605 is performed specifically in the following steps 606 through 609.

In step 606, a NAS transport message including an EAP message is forwarded between the UE 620 and the AMF 632.

In step 607, the AMF 632 and the NEF 634 forward a Nnef_communication_EAPmessage_Transfer message including the EAP message to each other.

In step 608, the AF/AAA server 640 and the NEF 634 forward the Nnef_communication_EAPmessage_Transfer message including the EAP message to each other.

If the authentication is conducted between the UE 620 and the AF/AAA server 640 through the exchange of the EAP message as above and the authentication is successfully completed, in step 609, an EAP success message is delivered from the AF/AAA server 640 to the UE 620 via the AMF 632.

A master key obtained through the authentication process is delivered to the AMF 632 in step 609, and a common security key is shared between the UE 620 and the AMF 632 in step 610. A security key to be used temporarily to protect NAS messages between the UE 620 and the AMF 632 is generated based on the shared security key, or a security key for protecting the NPN subscription data delivered through the NAS message between the UE 620 and the AMF 632 is generated. That is, in step 610, the security key is shared between the UE 620 and the AMF 632, and the security key is used for subsequent NAS signaling.

In the EAP authentication process of step 605, not only the authentication between the user of the UE 632 and the AF/AAA server 640, but also NPN subscription to be used by the UE 620 may be determined. Hence, the AF/AAA server 640 prepares NPN subscription data to be provided to the UE 620 and the UDM/UDR 633. According to various embodiments of the present disclosure, step 605 and step 610 described above may be performed if the UE is authenticated in the non-subscription network registration process of the UE 620 in step 604.

In step 611, the AF/AAA server 640 forwards to the NEF 634 the prepared NPN subscription data to be provided to the UE 620 and the UDM/UDR 633. The NPN subscription data is included in a Nnef_ParameterProvision_Create request/response message, or a Nnef_ParameterProvision_Update request/response message, or a Nnef_ServiceParameter_Create request/response message, or a Nnef_ServiceParameter_Update request/response message and delivered to the NEF 634.

In step 612, the NEF 634 forwards the NPN subscription data to the UDM/UDR 633. Specifically, in step 612, the NEF 634 includes the NPN subscription data in a Nudr_DM_Create request/response message, or a Nudr_DM_Update request/response message, or a Nudm_ParameterProvision_Create request/response message, or a Nudm_ParameterProvision_Update request and forwards it to the UDM or UDR 633. According to an embodiment, the response message for the request message of step 611 may be transmitted after receiving the response message of step 612.

The NEF 634 forwards the NPN subscription data to the UE 620. In step 612, the NEF 634 forwards to the UDM/UDR 633 the NPN subscription data to be forwarded to the UE 620. In step 613, the UDM/UDR 633 forwards the received NPN subscription data to the AMF 632 for which the UE 620 has performed the non-subscription network registration, for example, using a Nudm_SDM_Notify message.

The UDM/UDR 633 discovers the AMF 632 for which the UE 620 has performed the non-subscription network registration and the UE 620.

The messages of step 612 and step 613 may include information of the AMF 632 accessed by the UE 620, for example, a GUAMI, or an AMF name. In addition, the messages of step 612 and step 613 may include information of the UE 620, for example, the GUTI, or the PEI, or the user ID, or the GPSI information.

As yet another embodiment in which the NEF 634 forwards the NPN subscription data to the UE 620, in step 614, the NEF 634 forwards the NPN subscription data to the AMF 632 for which the UE 620 performs the non-subscription network registration using a Namf_communication_N1N2Message_Transfer message. The Namf_communication_N1N2Message_Transfer message may include the information of the UE 620, for example, the GUTI, or the PEI, or the user ID, or the GPSI information. To discover the AMF 632 for which the UE 620 performs the non-subscription network registration, the NEF 634 may use the information of the AMF 632 forwarded by the AMF 532 in informing the NEF 634 that the non-subscription network registration has occurred in step 604, for example, the GUAMI or the AMF name.

The AMF 632 receiving the NPN subscription data to be transmitted to the UE 620 forwards the NPN subscription data to the UE 620 through the UE Configuration Update command/complete message of step 615, or, through a DL NAS Transport message of step 616.

In step 617, to access using the newly received NPN subscription data, the UE 620 performs de-registration on the currently accessed SNPN 630, and performs the registration for the SNPN 630 using the newly allocated NPN subscription data. That is, the UE 620 accesses the SNPN 630 using the newly allocated NPN subscription data.

FIG. 7 illustrates a process of informing an AF of non-subscription network registration event occurrence through a UDM if a terminal performs non-subscription network registration in a wireless communication system according to various embodiments of the present disclosure.

Referring to FIG. 7, if recognizing that a UE 730 has performed the non-subscription network registration at an NPN 720, or, an SNPN 720, an AF 710 may be used to provide NPN subscriber information for the UE 730 according to a service provided by the AF 710.

In step 701, the AF 710 transmits a Nnef_EventExposure_subscribe request message to an N EF 721 of the NPN 720 to obtain whether the UE 730 has performed the non-subscription network registration, and thus requests subscription with respect to the non-subscription network registration occurrence. According to various embodiments of the present disclosure, the Nnef_EventExposure_subscribe request message may include the non-subscription registration, that is, "non-subscription network registration" as the event ID. If the AF 710 wants to know the non-subscription network registration occurrence for the UE 730 under a specific condition, the Nnef_EventExposure_subscribe request message may include the specific condition for the UE 730. According to various embodiments of the present disclosure, the specific condition of the UE 730 included in the Nnef_EventExposure_subscribe request message may include at least one of an eUICC ID of the access UE 730, or an eUICC ID list, or an eUICC ID range, or a PEI, or a PEI list, or a PEI range, or a user ID, or a GPSI, or a GPSI list, or GPSI range values, or a default credentials ID of the UE.

The NEF 721 receiving the Nnef_EventExposure_subscribe request message of step 701 transmits a Namf_EventExposure_subscribe message to a default UDM 722 of the NPN 720 to check the non-subscription network registration occurrence situation and thus requests subscription with respect to the non-subscription network registration occurrence, in step 702. At this time, the Namf_EventExposure_subscribe request message may include non-subscription registration, that is, "non-subscription network registration" as the event ID. If the specific condition for the UE 730 is given through the Namf_EventExposure_subscribe request message in step 701, the Namf_EventExposure_subscribe request message of step 702 may include the same specific condition and request the subscription for the non-subscription network registration occurrence event.

If the Namf_EventExposure_subscribe request of step 702 is accepted by the UDM 722, in step 703, the UDM 722 transmits a Namf_EventExposure_subscribe response message including a subscription correlation ID to the NEF 721 and thus informs that the subscription is conducted.

The NEF 721 receiving the Namf_EventExposure_subscribe response message of step 703 transmits to the AF 710 a Nnef_EventExposure_subscribe response message including the subscription correlation ID indicating that the Nnef_EventExposure_subscribe request has been accepted, in step 704.

In discovering the default UDM 722 in step 702, the NEF 721 may request a UDM for servicing the non-subscription network registration terminal from the NRF and find an appropriate default UDM, as shown in the embodiment of FIG. 4. The request message for finding the UDM to the NRF may include an indication indicating the 'non-subscription network registration terminal'. In addition, according to various embodiments of the present disclosure, the request message for discovering the UDM includes UE information, for example, at least one of an eUICC ID, or an eUICC ID list, or an eUICC ID range, or a PEI, or a PEI list or a PEI range or a user ID, or a GPSI, or a GPSI list, or a GPSI range values, or a default credentials ID of the UE.

In step 705, the UE 730 performs registration for the SNPN 720 without subscription. To perform the non-subscription network registration for the NPN 720, the UE 730 may transmit a registration request message including a non-subscription registration support indication to the AMF 723. The AMF 723 receiving the registration request message including the non-subscription registration support indication may proceed and complete the un-authenticated network registration by skipping the authentication procedure for the UE 730 or treating as successful authentication even if the authentication of the UE 730 fails. Alternatively, the authentication of the UE 730 may be performed based on non-subscription credentials stored in the UE 730. If the authentication of the UE 730 is completed, in proceeding with the un-authenticated network registration (or, the non-subscription network registration), the AMF 723 may select the default UDM 722 to acquire information for servicing the un-authenticated network registration UE 730 and receive the information for servicing the non-subscription network registration UE 730 from the default UDM 722.

In so doing, to select the default UDM 722, the AMF 723 may request a UDM for servicing the non-subscription network registration UE 730 from the NRF and discover the appropriate default UDM 722. The request message for discovering the default UDM 722 transmitted by the AMF 723 to the NRF may include an indication indicating 'non-subscription network registration UE'. In addition, the request message for discovering the default UDM 722 transmitted by the AMF 723 to the NRF may include information of the UE 730, for example, at least one of an eUICC ID, or an eUICC ID list, or an eUICC ID range, or a PEI, or a PEI list, or a PEI range, or a user ID, or a GPSI, or a GPSI list, or GPSI range values, or a default credentials ID of the UE.

The AMF 723 informs the selected default UDM 722 that the UE 730 has performed the non-subscription network registration at the SNPN 720, and also requests service information of the non-subscription network registration UE 730. The request message transmitted by the AMF 723 to the default UDM 722 for the service information of the non-subscription network registration UE 730 may include an indication indicating the 'non-subscription network registration UE 730'. In addition, the request message transmitted by the AMF 723 to the default UDM 722 may include the information of the UE 730, for example, at least one of the eUICC ID, or the eUICC ID list, or the eUICC ID range, or the PEI, or the PEI list, or the PEI range, or the user ID, or the GPSI, or the GPSI list, or the GPSI range values, or the default credentials ID of the UE.

Hence, the AMF 723 obtaining the service information of the non-subscription network registration UE 730 from the default UDM 722 may transmit to the UE 730 a registration accept message for the registration request received from the UE 730.

If the AMF 722 may not acquire the information of the accessed UE 730, during the network registration process or after the network registration for the NPN 720 of the UE 730 in step 705, the AMF 722 may request and receive the information of the UE 730 from the UE 730 in step 706 and step 707. In this case, the AMF 722 may use a UE identity request/response message to request and receive the information of the UE 730 from the UE 730. The information of the UE 730 which may be requested and received by the AMF 722 may include at least one of the user ID, the GPSI, or the PEI, or the eUICC ID, or the default credentials ID of the UE.

If recognizing the non-subscription network registration occurrence of the UE 730 which satisfies a specific condition, in step 708, the UDM 722 transmits a Namf_EventExposure_Notify message to the NEF 721 and thus notifies the event occurrence satisfying the specific condition. The Namf_EventExposure_Notify message may include the non-subscription registration, that is, "non-subscription network registration" as the event ID. In addition, the Namf_EventExposure_Notify message may include the information of the UE 730, for example, some or all of the user ID, the GPSI, or the PEI, or the eUICC ID. In addition, to inform information of the AMF 723 accessed by the UE 730, the Namf_EventExposure_Notify message may include information of the AMF 723, for example, some or all of an AMF name or GUAMI information.

The NEF 721 receiving the Namf_EventExposure_Notify message of step 708, transmits a Nnef_EventExposure_Notify message to the AF 710 to notify the AF 710 of the event occurrence satisfying the specific condition, in step 709. The Nnef_EventExposure_Notify message may include non-subscription registration, that is, "non-subscription network registration" as the event ID. In addition, the Nnef_EventExposure_Notify message may include the information of the UE 730 and the information of the AMF 723 received by the NEF 721 in step 708.

If Nnef_EventExposure_unsubscribe is used instead of Nnef_EventExposure_subscribe in the above-mentioned step 701 and step 704, an event previously subscribed to the NEF 721 may be released. In this case, the Nnef_EventExposure_unsubscribe request message includes a previously allocated subscription correlation ID. In addition, the NEF 721 transmits to the AF 710 a Nnef_EventExposure_unsubscribe response message indicating a processing result of the Nnef_EventExposure_unsubscribe request.

In addition, if Namf_EventExposure_unsubscribe is used instead of Namf_EventExposure_subscribe in step 702 and step 703, an event previously subscribed to the UDM 722 may be released. In this case, the Namf_EventExposure_unsubscribe request message includes a previously allocated subscription correlation ID. In addition, the UDM 722 transmits to the NEF 721 a Namf_EventExposure_unsubscribe response message indicating the processing result of the Namf_EventExposure_unsubscribe request. Hence, steps 705, 706, 707, 708, and 709 do not need to be executed any more.

Alternatively, if steps 701, 702, 703, and 704 are skipped, and the UE 730 performs the non-subscription network registration in step 705, the default UDM 722 notifies the access of the non-subscription network registration UE 730 to the AF 710 for providing a service to the non-subscription network registration UE 730 in steps 708 and 709. At this time, the UDM 722 or the NEF 721 may discover the AF 710 through the information forwarded in step 705 or step 707, for example, an FQDN configured through the eUICC ID, or the PEI information, or the default credential information of the UE 730, or an address value of a configured provisioning server According to yet another embodiment associated with FIG. 7 of the present disclosure, if the AF 710 belongs to a trusted domain of the SNPN 720, the AF 710 may directly exchange Namf_EventExposure_subscribe request/response messages with the AMF 722 through the process of step 702 and step 703, instead of passing through the NEF 721, and thus subscribe the event for the non-subscription network registration occurrence at the default UDM 722. In addition, if an event for the non-subscription network registration occurrence occurs, the default UDM 722 may transmit a Namf_EventExposure_Notify message to the AF 710 and thus notify the event occurrence for the non-subscription network registration occurrence.

Alternatively, if the above-described steps 701, 702, 703, and 704 are skipped, and the UE 730 performs the non-subscription network registration in step 705, the default UDM 722 may notify the access of the non-subscription network registration UE 730 by directly transmitting a Namf_EventExposure_Notify message to the AF 710 for providing the service for the non-subscription network registration UE 730 without passing through the NEF 721. At this time, the default UDM 722 may discover the AF 710 through the information forwarded by the UE 730 in step 705 or step 707, for example, the FQDN configured through the eUICC ID, or the PEI information or the default credential information of the UE, or the address value of the set provisioning server.

The methods according to the embodiments described in the claims or the specification of the present disclosure may be implemented in software, hardware, or a combination of hardware and software.

As for the software, a computer-readable storage medium storing one or more programs (software modules) may be provided. One or more programs stored in the computer-readable storage medium may be configured for execution by one or more processors of an electronic device. One or more programs may include instructions for controlling an electronic device to execute the methods according to the embodiments described in the claims or the specification of the present disclosure.

Such a program (software module, software) may be stored to a random access memory, a non-volatile memory including a flash memory, a read only memory (ROM), an electrically erasable programmable ROM (EEPROM), a magnetic disc storage device, a compact disc (CD)-ROM, digital versatile discs (DVDs) or other optical storage devices, and a magnetic cassette. Alternatively, it may be stored to a memory combining part or all of those recording media. A plurality of memories may be included.

Also, the program may be stored in an attachable storage device accessible via a communication network such as internet, intranet, local area network (LAN), wide LAN (WLAN), or storage area network (SAN), or a communication network by combining these networks. Such a storage device may access a device which executes an embodiment of the present disclosure through an external port. In addition, a separate storage device on the communication network may access the device which executes an embodiment of the present disclosure.

In the specific embodiments of the present disclosure, the components included in the present disclosure are expressed in a singular or plural form. However, the singular or plural expression is appropriately selected according to a proposed situation for the convenience of explanation, the present disclosure is not limited to a single component or a plurality of components, the components expressed in the plural form may be configured as a single component, and the components expressed in the singular form may be configured as a plurality of components.

Meanwhile, while the specific embodiment has been described in the detailed explanations of the present disclosure, it will be noted that various changes may be made therein without departing from the scope of the present disclosure. Therefore, the scope of the present disclosure should not be limited and defined by the described embodiments and should be defined by not only the scope of the claims to be described but also their equivalents.

The present disclosure generally relates to a wireless communication system, and more particularly, an apparatus and a method for providing subscription data to a non-subscription registered terminal in the wireless communication system.

The invention claimed is:

1. A method of operating a session management function (SMF) in a wireless communication system, the method comprising:
  receiving, from an access & mobility management function (AMF), a protocol data unit (PDU) session establishment request message including a non-subscription registration support indication provided from a user equipment (UE) associated with an extensible authentication protocol (EAP);
  determining whether a secondary authentication through a data network authentication, authorization and accounting (DN-AAA) server is required based on the non-subscription registration support indication;
  in case that the secondary authentication is required, identifying the DN-AAA server;
  performing the secondary authentication between the UE associated with the EAP and the identified DN-AAA server;
  establishing a PDU session in response to the secondary authentication which is successfully performed; and
  transmitting, to the AMF, a message notifying the establishment of the PDU session.

2. The method of claim 1,
  wherein the non-subscription registration support indication is included in the PDU session establishment request message, and
  wherein the SMF supports the EAP.

3. The method of claim 2,
  wherein information provided from the UE associated with the EAP indicates an un-authenticated state requiring the secondary authentication through the DN-AAA server.

4. An apparatus of a session management function (SMF) in a wireless communication system, the apparatus comprising:
  a transceiver; and
  at least one processor operably coupled to the transceiver, and configured to:
    receive, from an access & mobility management function (AMF), a protocol data unit (PDU) session establishment request message;
    determine whether a secondary authentication through a data network authentication, authorization and accounting (DN-AAA) server is required based on information provided from a user equipment (UE) associated with an extensible authentication protocol (EAP), the information including a non-subscription registration support indication;
    in case that the secondary authentication is required, identify the DN-AAA server;
    perform the secondary authentication between the UE associated with the EAP and the identified DN-AAA server;
    establish a PDU session in response to the secondary authentication which is successfully performed; and
    transmit, to the AMF, a message notifying the establishment of the PDU session.

5. The apparatus of claim 4,
  wherein the non-subscription registration support indication is included in the PDU session establishment request message, and
  wherein the SMF supports the EAP.

6. The apparatus of claim 5,
  wherein the information indicates an un-authenticated state requiring the secondary authentication through the DN-AAA server.

* * * * *

UNITED STATES PATENT AND TRADEMARK OFFICE
CERTIFICATE OF CORRECTION

PATENT NO. : 12,225,626 B2
APPLICATION NO. : 17/753541
DATED : February 11, 2025
INVENTOR(S) : Baek et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 324 days.

Signed and Sealed this
Twenty-second Day of July, 2025

Coke Morgan Stewart
*Acting Director of the United States Patent and Trademark Office*